United States Patent
Lehtiniemi et al.

(10) Patent No.: US 12,145,058 B2
(45) Date of Patent: Nov. 19, 2024

(54) INTERACTION IN A MULTI-USER ENVIRONMENT

(71) Applicant: Nokia Technologies Oy, Espoo (FI)

(72) Inventors: Arto Juhani Lehtiniemi, Lempäälä (FI); Jussi Artturi Leppänen, Tampere (FI); Lasse Juhani Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 594 days.

(21) Appl. No.: 17/282,621

(22) PCT Filed: Oct. 22, 2019

(86) PCT No.: PCT/EP2019/078633
§ 371 (c)(1),
(2) Date: Apr. 2, 2021

(87) PCT Pub. No.: WO2020/088978
PCT Pub. Date: May 7, 2020

(65) Prior Publication Data
US 2021/0354035 A1  Nov. 18, 2021

(30) Foreign Application Priority Data

Oct. 30, 2018  (EP) ..................... 18203511

(51) Int. Cl.
*A63F 9/24* (2006.01)
*A63F 11/00* (2006.01)
(Continued)

(52) U.S. Cl.
CPC .......... *A63F 13/48* (2014.09); *G06F 3/04815* (2013.01); *G06T 19/20* (2013.01); *G06T 2219/024* (2013.01); *G06T 2219/2004* (2013.01)

(58) Field of Classification Search
CPC ... G07F 17/32; G07F 17/3211; G07F 17/3214
(Continued)

(56) References Cited

U.S. PATENT DOCUMENTS 10,055,083 B2 * 8/2018 Sweeney ............. G06F 3/04842
11,511,199 B2 * 11/2022 Marchiorello ...... A63F 13/5255
(Continued)

FOREIGN PATENT DOCUMENTS

EP    3579121 A1   12/2019
WO   99/32990 A2   7/1999

OTHER PUBLICATIONS

Office action received for corresponding European Patent Application No. 18203511.3, dated May 12, 2023, 8 pages.
(Continued)

*Primary Examiner* — Adetokunbo O Torimiro
(74) *Attorney, Agent, or Firm* — ALSTON & BIRD LLP

(57) ABSTRACT

An apparatus, method and computer program are described comprising: receiving first interaction data at a first user in a multi-user virtual environment, wherein the multi-user virtual environment comprises a plurality of users including the first user; receiving metadata relating to the first interaction data at the first user; and rendering a first object to the first user in accordance with the first interaction data and the metadata, wherein the metadata includes instructions for selectively modifying one or more of the rendering of the first object and an interaction of the first user with the virtual environment.

20 Claims, 9 Drawing Sheets

(51) Int. Cl.
*A63F 13/48* (2014.01)
*G06F 3/04815* (2022.01)
*G06F 13/00* (2006.01)
*G06F 17/00* (2019.01)
*G06T 19/20* (2011.01)

(58) Field of Classification Search
USPC .............................. 463/1, 20, 22, 24, 30, 39
See application file for complete search history.

(56) References Cited

U.S. PATENT DOCUMENTS

| | | | | |
|---|---|---|---|---|
| 2012/0204202 | A1* | 8/2012 | Rowley | A63F 13/213 |
| | | | | 725/12 |
| 2015/0306503 | A1* | 10/2015 | Yerli | G06F 3/048 |
| | | | | 705/39 |
| 2016/0243441 | A1 | 8/2016 | Garbowski et al. | |
| 2017/0358138 | A1* | 12/2017 | Dack | G06F 1/163 |
| 2018/0005429 | A1* | 1/2018 | Osman | A63F 13/56 |

OTHER PUBLICATIONS

Office action received for corresponding European Patent Application No. 18203511.3, dated Dec. 16, 2021, 6 pages.
Finnish Application No. 20185561, "An Apparatus, a Method and a Computer Program for Reproducing Spatial Audio", filed on Jun. 21, 2018, 24 pages.
Extended European Search Report received for corresponding European Patent Application No. 18203511.3, dated Apr. 18, 2019, 9 pages.
Capps et al., "Research Issues in Developing Networked Virtual Realities: Working Group Report on Distributed System Aspects of Sharing a Virtual Reality", Proceedings of IEEE 6th Workshop on Enabling Technologies: Infrastructure for Collaborative Enterprises, vol. 1, 1997, pp. 205-211.
International Search Report and Written Opinion received for corresponding Patent Cooperation Treaty Application No. PCT/EP2019/078633, dated Dec. 17, 2019, 13 pages.
Intention to Grant for European Application No. 18203511.3 dated May 27, 2024, 9 pages.

* cited by examiner

INTERACTION IN A MULTI-USER ENVIRONMENT

RELATED APPLICATION

This application claims priority to PCT Application No. PCT/EP2019/078633, filed on Oct. 22, 2019, which claims priority to European Application No. 18203511.3, filed on Oct. 30, 2018, each of which is incorporated herein by reference in its entirety.

FIELD

This specification relates to multi-user environments, in particular multi-user virtual environments.

BACKGROUND

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A VR headset may be configured to provide VR video and audio content to the user, e.g. through the use of a pair of video screens and headphones incorporated within the headset.

Mixed reality (MR) is an area of technology in which real and virtual worlds are combined such that physical and digital objects co-exist and interact in real time. Augmented reality (AR) refers to a real-world view that is augmented by computer-generated sensory input. In the context of the present specification, the term mixed reality is intended to encompass augmented reality.

Content may be provided to one or more users within a virtual environment, such as a virtual reality, augmented reality or mixed reality environment. There remains a need for developments for controlling such display systems.

SUMMARY

In a first aspect, this specification describes an apparatus (e.g. a user device) comprising: means for receiving first interaction data at a first user in a multi-user virtual environment, wherein the multi-user virtual environment comprises a plurality of users including the first user; means for receiving metadata relating to the first interaction data at the first user; and means for rendering a first object (such as a virtual object) to the first user in accordance with the first interaction data and the metadata, wherein the metadata includes instructions for selectively modifying one or more of the rendering of the first object and an interaction of the first user with the virtual environment. The first interaction data may be virtual reality content, or similar content.

The metadata may comprise a target time for the first user (e.g. for each user) to reach the rendered first object. The target time may be a timestamp. The target time may be the same for all users in the multi-user interactive environment. Alternatively, or in addition, the metadata may comprise an initial distance between a current position of the first user (e.g. for each user) and the rendered first object within the virtual environment.

Modifying the rendering of the first object may comprise modifying a position of the rendering (e.g. at a first distance from a current, virtual, position of the first user) within the virtual environment. Alternatively, or in addition, the rendering of the first object may comprise placing one or more obstacles between a current position of the first user and the rendering of the first object within the virtual environment. The rendering of the first object may be set in order to meet a target time for a user to reach the rendered object.

Modifying the interaction of the first user with the virtual environment may comprise modifying a movement speed (such as a maximum movement speed) of the first user within the virtual environment, Alternatively, or in addition, the interaction of the first user with the virtual environment may comprise modifying one or more other objects in the virtual environment (e.g. by modifying object size and/or position). Alternatively, or in addition, the interaction of the first user with the virtual environment may comprise modifying a start time of an event.

Some embodiments may further comprise means for providing a notification to the first user in the event of a modification of the rendering of the first object and/or a modification of the interaction of the first user with the virtual environment in accordance with the metadata.

Some embodiments may further comprise: means for receiving a plurality of interaction data, the plurality of interaction data include the first interaction data; means for receiving a plurality of corresponding metadata; and means for rendering a plurality of objects to the first user in accordance with the plurality of interaction data and the metadata, wherein the plurality of objects include the first object.

In a second aspect, this specification describes an apparatus (e.g. at a server side) comprising: means for providing first interaction data to each of a plurality of users in a multi-user virtual environment, wherein the first interaction data provides initial instructions for rendering an object (such as a virtual object) within the virtual environment; and means for providing metadata relating to the first interaction data to each of the plurality of users, wherein each metadata includes instructions for selectively modifying one or more of a rendering of the respective object to the respective user and an interaction of the respective user with the virtual environment.

The second aspect may further comprise means for determining broadcast delays for receiving the first interaction data at control modules (e.g. interaction clients) of each of the plurality of users.

In some embodiments, modifying the rendering of the respective object and/or modifying the interaction of the respective user with the virtual environment may be arranged to compensate for differing interaction delays among the plurality of users.

In some embodiments, said modifying for the first user may start after a reaction of the any one of the plurality of users to receiving the first object.

In the first and second aspects described above, the means may comprise: at least one processor; and at least one memory including computer program code, the at least one memory and the computer program code configured, with the at least one processor, to cause the performance of the apparatus.

In a third aspect, this specification describes a method comprising: receiving first interaction data at a first user in a multi-user virtual environment, wherein the multi-user virtual environment comprises a plurality of users including the first user; receiving metadata relating to the first interaction data at the first user; and rendering a first object to the first user in accordance with the first interaction data and the metadata, wherein the metadata includes instructions for selectively modifying one or more of the rendering of the first object and an interaction of the first user with the virtual environment.

The metadata may comprise a target time for the first user (e.g. for each user) to reach the rendered first object. The target time may be a timestamp. The target time may be the same for all users in the multi-user interactive environment. Alternatively, or in addition, the metadata may comprise an initial distance between a current position of the first user (e.g. for each user) and the rendered first object within the virtual environment.

Modifying the rendering of the first object may comprise modifying a position of the rendering (e.g. at a first distance from a current, virtual, position of the first user) within the virtual environment. Alternatively, or in addition, the rendering of the first object may comprise placing one or more obstacles between a current position of the first user and the rendering of the first object within the virtual environment. The rendering of the first object may be set in order to meet a target time for a user to reach the rendered object.

Modifying the interaction of the first user with the virtual environment may comprise modifying a movement speed (such as a maximum movement speed) of the first user within the virtual environment, Alternatively, or in addition, the interaction of the first user with the virtual environment may comprise modifying one or more other objects in the virtual environment (e.g. by modifying object size and/or position). Alternatively, or in addition, the interaction of the first user with the virtual environment may comprise modifying a start time of an event.

Some embodiments may further comprise providing a notification to the first user in the event of a modification of the rendering of the first object and/or a modification of the interaction of the first user with the virtual environment in accordance with the metadata.

Some embodiments may further comprise: receiving a plurality of interaction data, the plurality of interaction data include the first interaction data; receiving a plurality of corresponding metadata; and rendering a plurality of objects to the first user in accordance with the plurality of interaction data and the metadata, wherein the plurality of objects include the first object.

In a fourth aspect, this specification describes a method comprising: providing first interaction data to each of a plurality of users in a multi-user virtual environment, wherein the first interaction data provides initial instructions for rendering an object within the virtual environment; and providing metadata relating to the first interaction data to each of the plurality of users, wherein each metadata includes instructions for selectively modifying one or more of a rendering of the respective object to the respective user and an interaction of the respective user with the virtual environment.

In some embodiments, modifying the rendering of the respective object and/or modifying the interaction of the respective user with the virtual environment may be arranged to compensate for differing interaction delays among the plurality of users.

In some embodiments, said modifying for the first user may start after a reaction of the any one of the plurality of users to receiving the first object.

In a fifth aspect, this specification describes any apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions for causing an apparatus to perform at least the following: receive first interaction data at a first user in a multi-user virtual environment, wherein the multi-user virtual environment comprises a plurality of users including the first user; receive metadata relating to the first interaction data at the first user; and receive a first object to the first user in accordance with the first interaction data and the metadata, wherein the metadata includes instructions for selectively modifying one or more of the rendering of the first object and an interaction of the first user with the virtual environment.

In an eighth aspect, this specification describes a computer program comprising instructions for causing an apparatus to perform at least the following: provide first interaction data to each of a plurality of users in a multi-user virtual environment, wherein the first interaction data provides initial instructions for rendering an object within the virtual environment; and provide metadata relating to the first interaction data to each of the plurality of users, wherein each metadata includes instructions for selectively modifying one or more of a rendering of the respective object to the respective user and an interaction of the respective user with the virtual environment.

In a ninth aspect, this specification describes a computer-readable medium (such as a non-transitory computer readable medium) comprising program instructions stored thereon for performing any method as described with reference to the third or fourth aspects.

In a tenth aspect, this specification describes an apparatus (e.g. a user device) comprising: a first input for receiving first interaction data at a first user in a multi-user virtual environment, wherein the multi-user virtual environment comprises a plurality of users including the first user; a second input for receiving metadata relating to the first interaction data at the first user; and a rendering module for rendering a first object (such as a virtual object) to the first user in accordance with the first interaction data and the metadata, wherein the metadata includes instructions for selectively modifying one or more of the rendering of the first object and an interaction of the first user with the virtual environment. The first interaction data may be virtual reality content, or similar content.

In an eleventh aspect, this specification describes an apparatus (e.g. at a server side) comprising: a first output for providing first interaction data to each of a plurality of users in a multi-user virtual environment, wherein the first interaction data provides initial instructions for rendering an object (such as a virtual object) within the virtual environment; and a second output for providing metadata relating to the first interaction data to each of the plurality of users, wherein each metadata includes instructions for selectively modifying one or more of a rendering of the respective object to the respective user and an interaction of the respective user with the virtual environment.

BRIEF DESCRIPTION OF THE DRAWINGS

Example embodiments will now be described, by way of non-limiting examples, with reference to the following schematic drawings.

DETAILED DESCRIPTION

Figure 1:
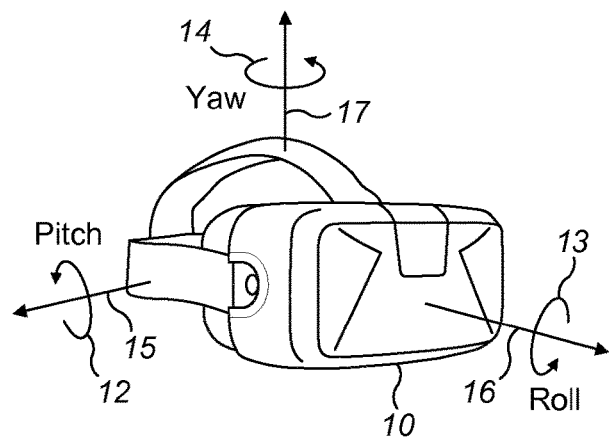
FIG. 1 shows a virtual reality or augmented reality headset.

In the description, like reference numerals relate to like elements throughout.

FIG. 1 shows a virtual reality or augmented reality headset 10, for displaying visual data for a virtual reality or augmented reality space. The headset 10 may comprise augmented reality (AR) glasses, which may enable visual content, for example one or more virtual objects, to be projected or displayed on top of a see-through portion of the glasses.

The headset 10 receives the virtual reality or augmented reality content data, for example from a media player (not shown). Here, the media player may comprise a mobile phone, smartphone or tablet computer configured to play content through its display. For example, the media player may be a touchscreen device having a large display over a major surface of the device, through which video content can be displayed. The media player may be inserted into a holder of a headset 10. With such headsets 10, a smart phone or tablet computer may display visual data which is provided to a user's eyes via respective lenses in the headset 10. The visual data may be provided as a stereoscopic display where the two slightly different angles of the visual scene are displayed to each eye.

The headset 10 may include means for determining the spatial position of the user and/or orientation of the user's head. This may be by means of determining the spatial position and/or orientation of the headset 10. Over successive time frames, a measure of movement may therefore be calculated and stored. For example, the headset 10 may incorporate motion tracking sensors which may include one or more of gyroscopes, accelerometers and structured light systems. These sensors may generate position data from which a current visual field-of-view (FOV) is determined and updated as the user, and so the headset 10, changes position and/or orientation. The headset 10 may comprise two digital screens for displaying stereoscopic video images of the virtual world in front of respective eyes of the user, and also two speakers for delivering audio, if provided. The example embodiments herein are not limited to a particular type of headset 10.

In some example embodiments, the spatial position and/or orientation of the user's head may be determined using a six degrees of freedom (6DoF) method. As shown in FIG. 1, these include measurements of pitch 12, roll 13 and yaw 14 and also translational movement in Euclidean space along side-to-side, front-to-back and up-and-down axes 15, 16 and 17. (The use of a six-degrees of freedom headset is not essential. For example, a three-degrees of freedom headset could readily be used.)

The display system 10 may be configured to display virtual reality or augmented reality content data to the user based on spatial position and/or the orientation of the headset 10. A detected change in spatial position and/or orientation, i.e. a form of movement, may result in a corresponding change in the visual data to reflect a position or orientation transformation of the user with reference to the space into which the visual data is projected. This allows virtual reality content data to be consumed with the user experiencing a 3D virtual reality or augmented reality environment.

Figure 2:
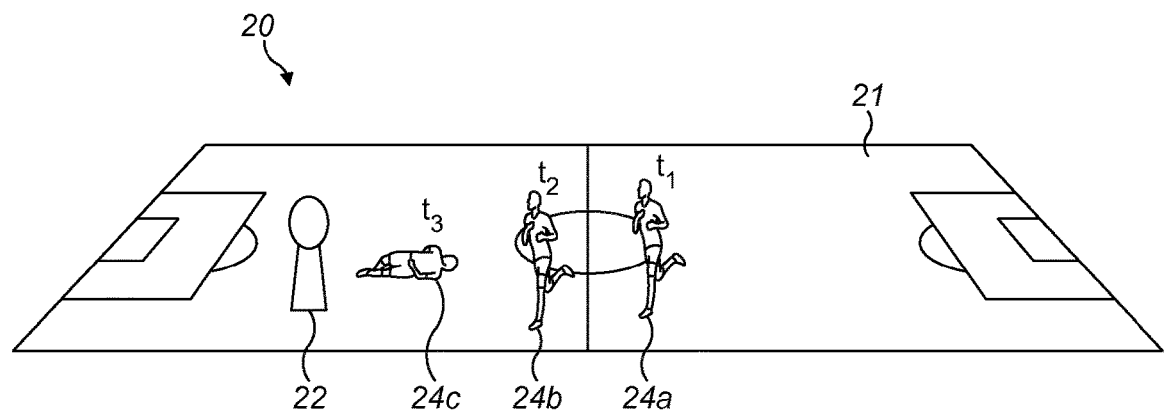
FIGS. 2 to 5 show views in accordance with example embodiments.

FIG. 2 shows a view, indicated generally by the reference numeral 20, in accordance with an example embodiment. The view 20 may, for example, be presented to a viewer using the headset 10.

The view 20 shows a sports event, such as a football match. The view 20 may be presented as a six degrees of freedom (6DoF) presentation (although this is not essential to all embodiments). The view 20 includes a pitch 21 and a representation of a first user 22. The first user 22 may move around the pitch 21. Also shown in the view 20 is a player 24 running around the pitch 21. At time $t_1$, the player is running and is in position 24a. At time $t_2$, the player is running and is in position 24b. At time $t_3$, the player has fallen and is in position 24c.

Figure 3:
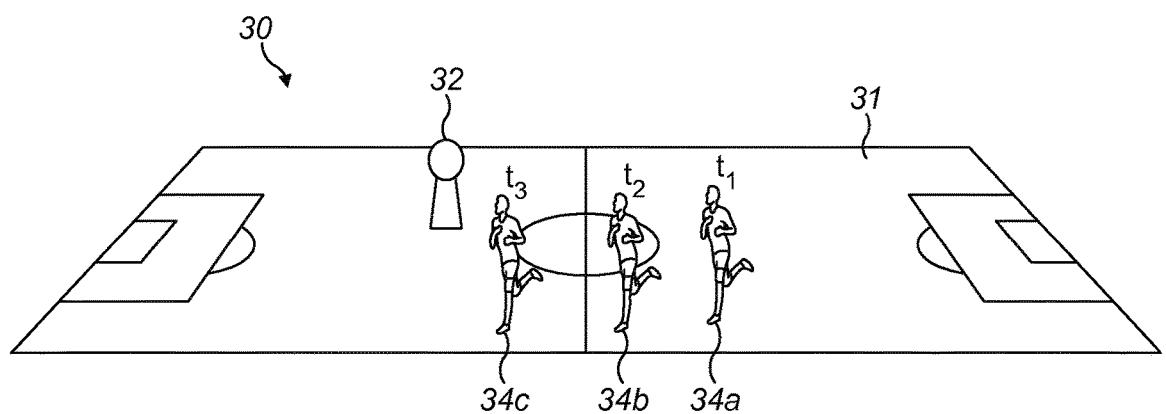

FIG. 3 shows a view, indicated generally by the reference numeral 30, in accordance with an example embodiment. The view 30 may, for example, be presented to a viewer using the headset 10.

The view 30 shows the same sports event as the view 20. That event may be a live broadcast of a sports event. As with the view 20, the view 30 may be presented as a six degrees of freedom (6DoF) presentation. The view 30 includes a pitch 31 and a representation of a second user 32. The second user 32 may move around the pitch 31. Also shown in the view 30 is a player 34 running around the pitch 31. The player 34 and the pitch 31 are the same as the player 24 and the pitch 21 described above. However, due to transmission channel differences and other issues, the views 20 and 30 may be presented with differing delays.

As shown in FIG. 3, at time $t_1$, the player 34 is running and is in position 34a. At time $t_2$, the player is running and is in position 34b. At time $t_3$, the player is still running and is in position 34c. The positions 34b and 34c correspond to the positions 24a and 24b in the view 20. Thus, when the first user 22 sees the player falling down (at time $t_3$) in the view 20, the second user 32 is still seeing the player running.

In some circumstances, differing transmission (and other) delays are of limited significance. For example, if one viewer sees an action is a sports event slightly later than another viewer, that may not be significant. However, there are some circumstances where such differences may cause difficulties.

Figure 4:
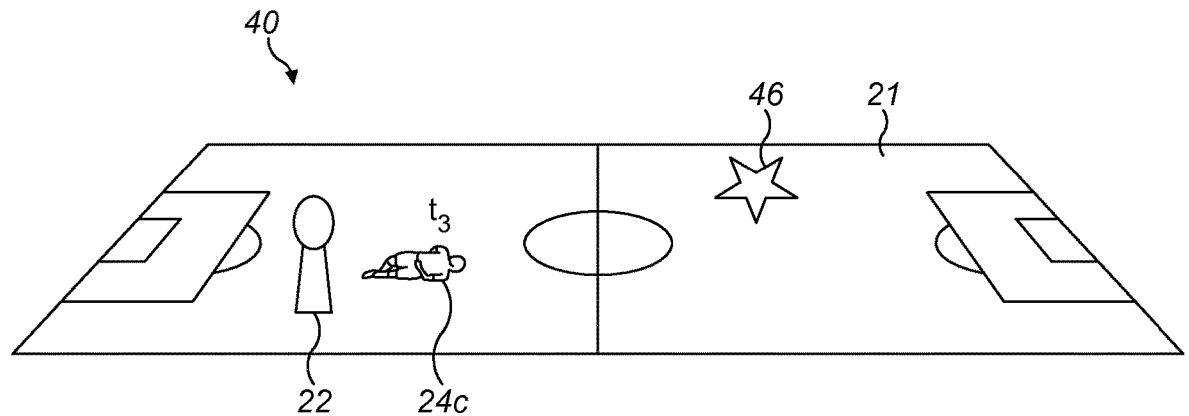

FIG. 4 shows a view, indicated generally by the reference numeral 40, in accordance with an example embodiment.

The view 40 may, for example, be presented to a viewer using the headset 10. The view 40 includes the pitch 21 and the first user 22 described above. Furthermore, the view 40 shows the fallen player in position 24c at time $t_3$.

Figure 5:
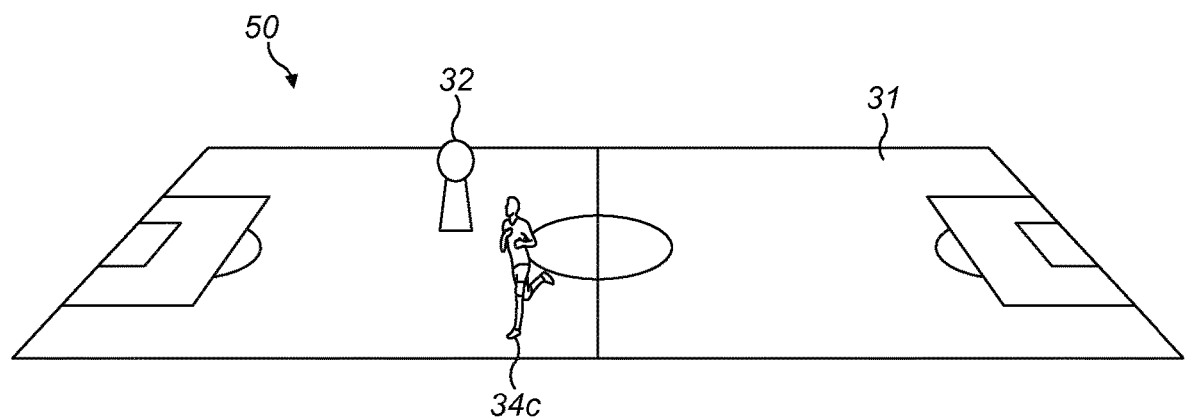

FIG. 5 shows a view, indicated generally by the reference numeral 50, in accordance with an example embodiment. The view 50 may, for example, be presented to a viewer using the headset 10. The view 50 includes the pitch 31 and the first user 32 described above. Furthermore, the view 50 shows the running player in position 34c at time $t_3$.

In addition to the regular broadcast of the sports event being displayed in the views 40 and 50, an interactive element is added (e.g. by the relevant broadcaster). The interactive element 46 is shown in FIG. 4. Due to broadcast delays, when the interactive element is first shown in FIG. 4, the corresponding interactive element is not (yet) shown in FIG. 5.

The interactive element 46 may be associated with a competition. For example, the first user to move within the respective display to the position of the interactive element may win a prize. In the example displays 40 and 50, the competition effectively starts earlier for the first user 22 than for the second user 32.

Figure 6:
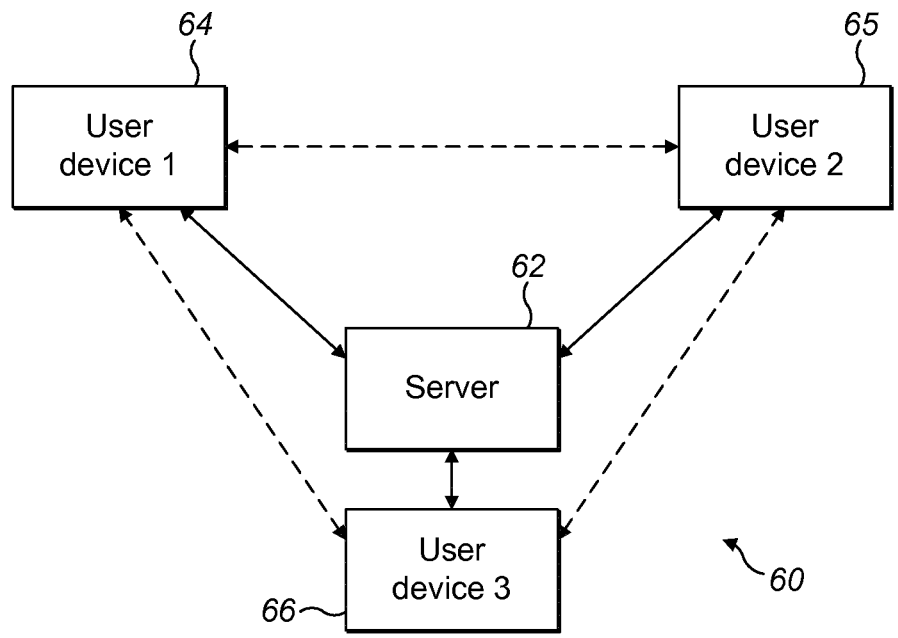
FIG. 6 is a block diagram of a system in accordance with an example embodiment.

FIG. 6 is a block diagram of a system, indicated generally by the reference numeral 60, in accordance with an example embodiment. The system 60 comprises a server 62, a first user device 64, a second user device 65 and a third user device 66. The server 62 may broadcast data, including data relating to the sports event and the interaction data described above with reference FIGS. 2 to 5 described above. By way of example, the first user device 64 may provide views (such as the views 20 and 40 described above) to the first user 22 and the second user device 65 may be provide views (such as the views 30 and 50 described above) to the second user 32. Similarly, the third user device 66 may provide views to a third user (not shown).

As indicated in FIG. 6, the user devices 64 to 66 may be in communication with each other (as indicated by the dotted lines). For example, a low delay communication link may be provided between the user devices. Thus, each user device may be able to receive information from the server 62, provide information (such as delay information) to the server and send and receive information to/from at least some other user devices in the system 60. It should be noted that some or all of the communication links between the user devices 62 to 66 may be omitted in some example embodiments.

Figure 7:
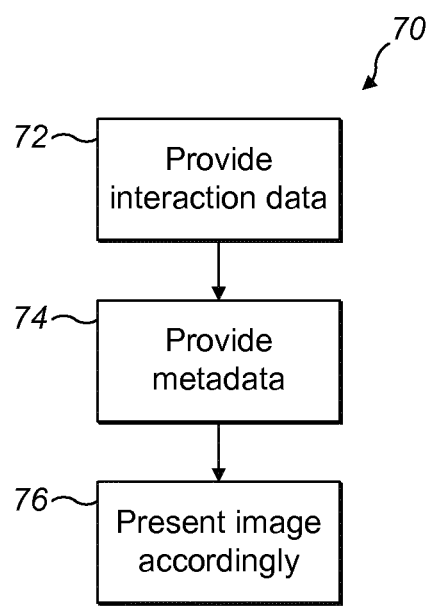
FIGS. 7 and 8 are flow charts showing algorithms in accordance with example embodiments.

FIG. 7 is a flow chart showing an algorithm, indicated generally by the reference numeral 70, in accordance with an example embodiment. The algorithm 70 starts at operation 72 where interaction data is provided by the server 62, for example to each of the first, second and third user devices 64 to 66. Next, at operation 74, metadata relating to the interaction data is provided by the server 62, for example to each of the first, second and third user devices 64 to 66. Finally, at operation 76, images are presented to the users in accordance with the provided interaction data and metadata.

Figure 8:
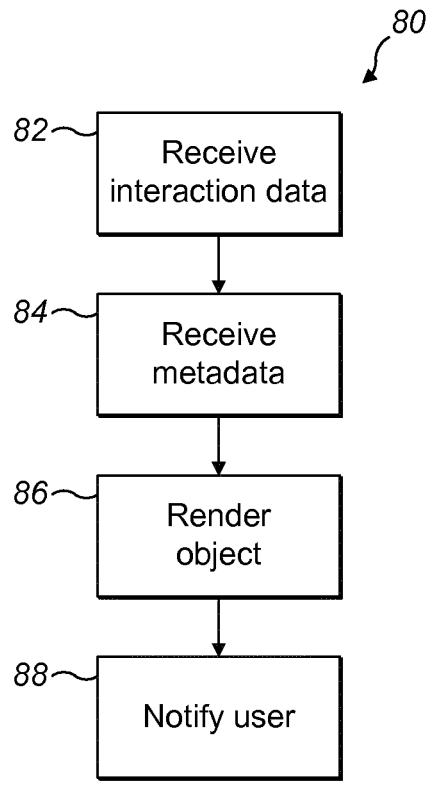

FIG. 8 is a flow chart showing an algorithm, indicated generally by the reference numeral 80, in accordance with an example embodiment. Instances of the algorithm 80 may be implemented at each user device (such as each of the first, second and third user devices 64 to 66 described above).

The algorithm 80 starts at operation 82 where interaction data is received at the respective user device. Next, at operation 84, metadata relating to the interaction data is received from the server 62. Then, at operation 86, objects are rendered to the respective user in accordance with the received interaction data and metadata.

The algorithm 80 may further comprise an optional operation 88 in which a notification is provided to the respective user in the event of a modification of the rendering of an object and/or a modification of the interaction of the first user with the virtual environment in accordance with the metadata (as discussed further below). Thus, a user may be notified in the event that their experience is changed (e.g. temporarily) due to an interactive element being presented (e.g. in the event that a competition is occurring).

Thus, the system 60 may provide a multi-user virtual environment in which each of the user devices 64 to 66 comprises means for receiving first interaction data (such as virtual reality or similar content), means for receiving metadata relating to the first interaction data, and means for rendering a first object to the respective user in accordance with the first interaction data and the metadata.

Thus, the algorithms 70 and 80 make use of metadata for modifying rendering of content (such as streamed VR content) and/or modifying user movement when an interactive element is provided. In this way, users are able to interact with such an interactive element in a synchronized manner, despite differing delays.

Example implementations of the algorithms 70 and 80 may make use of perceptual scope to users that are in scope and to whom the interactive object is made visible. For example, users who are close to the interactive object and have a chance of reaching the item may be in scope. In some cases, a user might become inside the perceptual scope during the interactive object validity time and the user experience modification described herein may apply to those users at that time.

As described in further detail below, changing the user experience may include one or more of:
  Moving an interactive object further away from one or more users.
  Moving an interactive object closer to one or more users.
  Adjusting movement speeds of one or more users.

Although the algorithms 70 and 80 show the interaction data and metadata being provided in different operations, this is not essential to all embodiments. For example, the interaction data and the metadata may be provided in a single operation (such that operations 72 and 74 may be combined into a single operation and operations 82 and 84 may be combined into a single operation).

The metadata provided in operation 74 and received in operation 84 may include instructions for selectively modifying one or more of the rendering of the respective object and an interaction of the respective user with the virtual environment. The metadata may take many different forms, as described further below.

Figure 9:
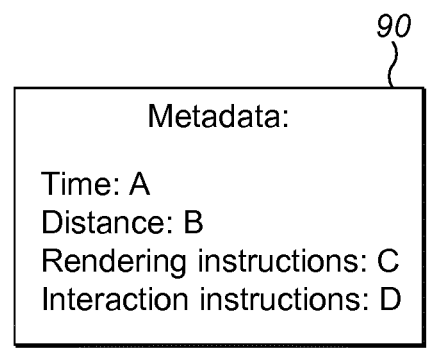
FIG. 9 shows example metadata in accordance with an example embodiment.

FIG. 9 shows example metadata, indicated generally by the reference numeral 90, in accordance with an example embodiment. The metadata 90 may take many different forms. For example, the metadata may include one or more of: a target time A (e.g. a timestamp) for a user to reach the rendered first object; an initial distance B between a current position of the respective user and the rendered first object within the virtual environment; instructions C for selectively modifying the rendering of the respective object; and instructions D relating to an interaction of a respective user and the virtual environment.

FIGS. 10 to 14 show example views in which different uses of metadata in accordance with example embodiments are shown.

Figure 10A:
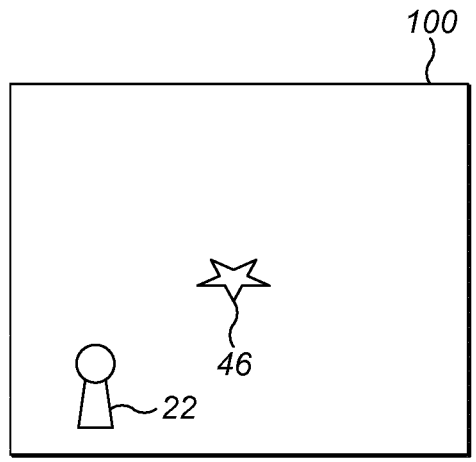
FIGS. 10A and 10B show views in accordance with an example embodiment.
Figure 10B:
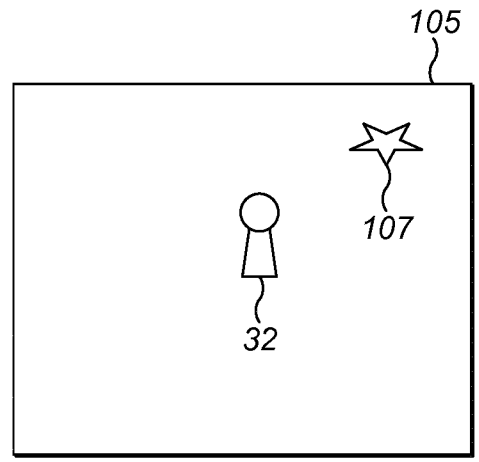

FIG. 10A shows a view, indicated generally by the reference numeral 100, in accordance with an example embodiment. The view 100 is similar to the view 40 described above and includes the first user 22 and the first interactive element 46. FIG. 10B shows a view, indicated generally by the reference numeral 105, in accordance with an example embodiment. The view 105 is similar to the view 50 described above and includes the second user 32 and a second interactive element 107.

As shown in FIGS. 10A and 10B, the first user 22 and the second user 32 are in different positions. To take account of the relative positions of the first user 22 and the second user 32, the position of the second interactive element 107 is modified relative to the position of the first interaction element 46. The modification may be made in order, for example, to meet a target time to reach the rendered object. Alternatively, the modification may be made in order to provide the interactive element 107 at a defined distance from the respective user (which variable may be defined in the metadata).

Figure 11A:
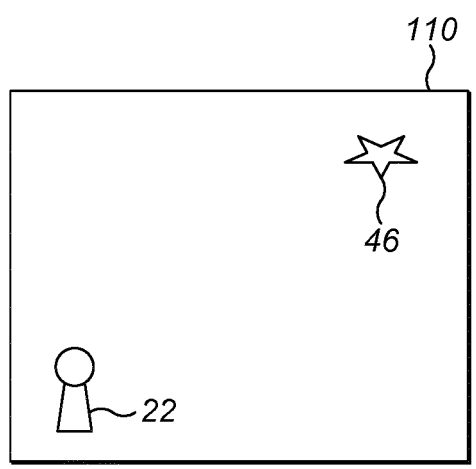
FIGS. 11A and 11B show views in accordance with an example embodiment.
Figure 11B:
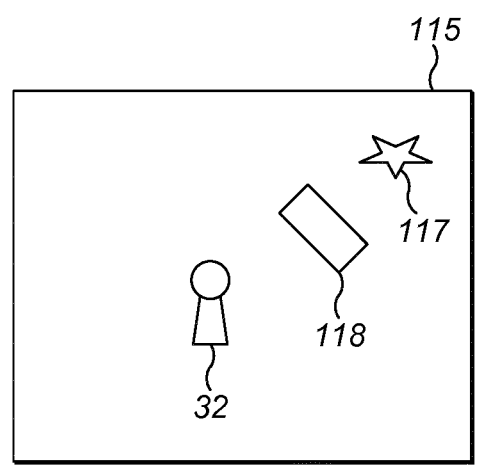

FIG. 11A shows a view, indicated generally by the reference numeral 110, in accordance with an example embodiment. The view 110 is similar to the view 40 described above and includes the first user 22 and the first interactive element 46. FIG. 11B shows a view, indicated generally by the reference numeral 115, in accordance with an example embodiment. The view 115 is similar to the view 50 described above and includes the second user 32 and a second interactive element 117. The view 115 additionally includes an obstacle 118.

As shown in FIGS. 11A and 11B, the first user 22 and the second user 32 are in different positions but the first interactive element 46 and the second interactive element 117 are in the same positions. To take account of the relative positions of the first user 22 and the second user 32, the obstacle 118 is placed between the second user and the rendering of the second interactive element. The obstacle 118 may be positioned in order, for example, to meet a target time for the second user 32 to reach the rendered object (as defined by the metadata).

Figure 12A:
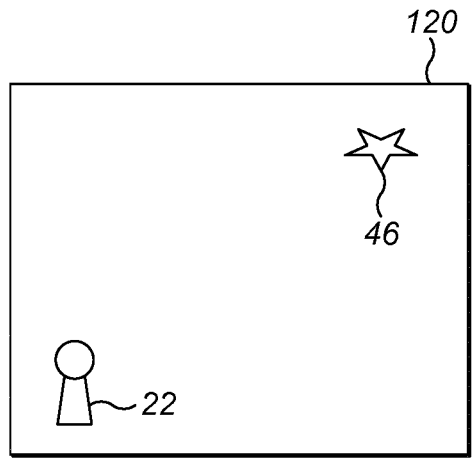
FIGS. 12A and 12B show views in accordance with an example embodiment.
Figure 12B:
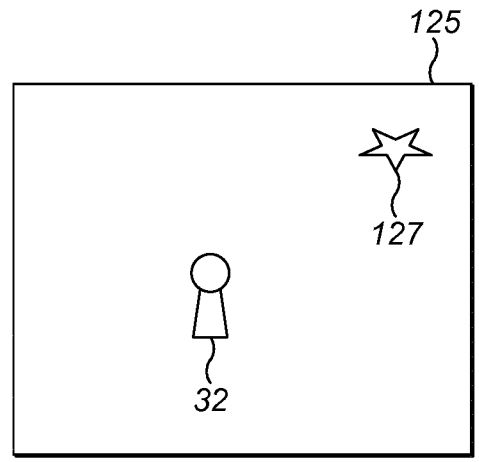

FIG. 12A shows a view, indicated generally by the reference numeral 120, in accordance with an example embodiment. The view 120 is similar to the view 40 described above and includes the first user 22 and the first interactive element 46. FIG. 12B shows a view, indicated generally by the reference numeral 125, in accordance with an example embodiment. The view 125 is similar to the view 50 described above and includes the second user 32 and a second interactive element 127.

As shown in FIGS. 12A and 12B, the first user 22 and the second user 32 are in different positions, but the first interactive element 46 and the second interactive element 127 are in the same positions. To take account of the relative positions of the first user 22 and the second user 32, the interaction of one or more of the users with the respective virtual environments is changed (for example by modifying a movement speed, such as a maximum movement speed) within the virtual environment. The interaction may be modified in order, for example, to meet a target time to reach the rendered object (as defined by the metadata).

Figure 13A:
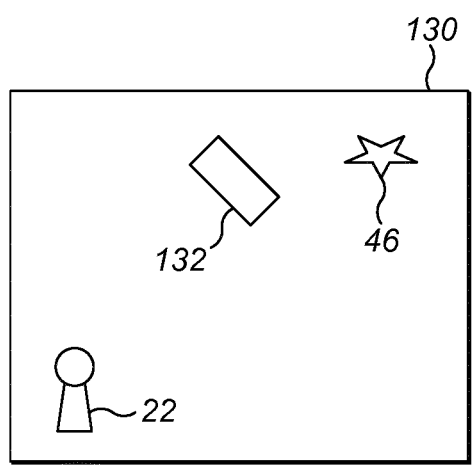
FIGS. 13A and 13B show views in accordance with an example embodiment.
Figure 13B:
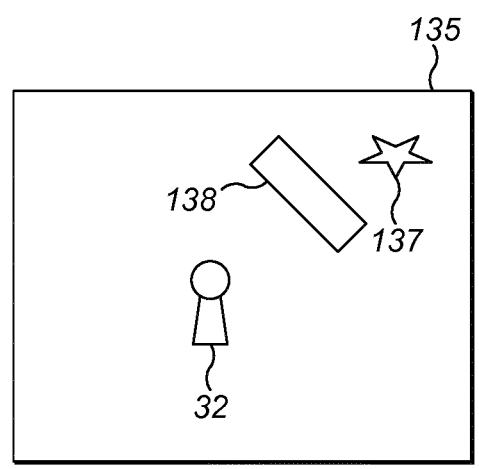

FIG. 13A shows a view, indicated generally by the reference numeral 130, in accordance with an example embodiment. The view 130 is similar to the view 40 described above and includes the first user 22 and the first interactive element 46. The view 130 also has a first additional object 132. FIG. 13B shows a view, indicated generally by the reference numeral 135, in accordance with an example embodiment. The view 135 is similar to the view 50 described above and includes the second user 32 and a second interactive element 137. The view 135 also has a second additional object 138.

As shown in FIGS. 13A and 13B, the first user 22 and the second user 32 are in different positions, but the first interactive element 46 and the second interactive element 137 are in the same positions. To take account of the relative positions of the first user 22 and the second user 32, the additional object is modified (for example by modifying a size and/or position of the object). The additional object may be modified in order, for example, to meet a target time to reach the rendered object (as defined by the metadata).

Figure 14A:
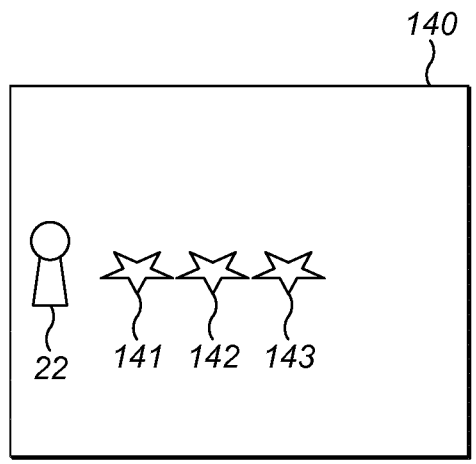
FIGS. 14A and 14B show views in accordance with an example embodiment.
Figure 14B:
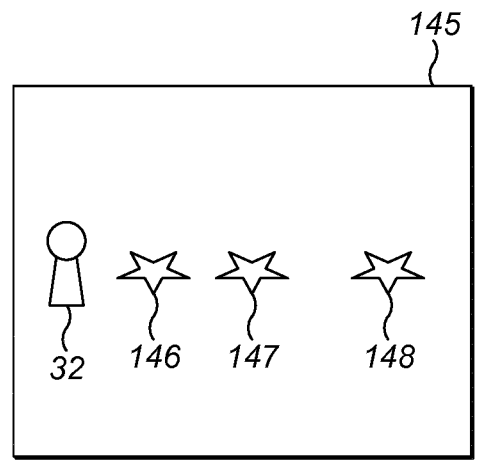

FIG. 14A shows a view, indicated generally by the reference numeral 140, in accordance with an example embodiment. The view 140 is similar to the view 40 described above and includes the first user 22. The view 40 also shows a chain of first interactive element 141, 142 and 143. FIG. 14B shows a view, indicated generally by the reference numeral 145, in accordance with an example embodiment. The view 145 is similar to the view 50 described above and includes the second user 32. The view 50 also shows a chain of second interactive elements 146, 147 and 148. A competition in the views 140 and 150 may, for example, be to collect three 'stars' to win.

As shown in FIGS. 14A and 14B, the first user 22 and the second user 32 are in the same positions and the first in each chain of interactive elements are in the same positions. However, to take account of differing delays, the distance from the second user to the final one of the chain of second interactive elements is made longer than the distance from the first user to the final one of the chain of first interactive elements. The said distance may be modified in order, for example, to meet a target time to reach the rendered object (as defined by the metadata).

Various embodiments for modifying the interaction of a first user with a virtual environment are described above. Alternative embodiments are possible. For example, a start time of an event may be modified. For example, the start time of an event may be delayed for users that are closer to the respective interactive element.

Figure 15:
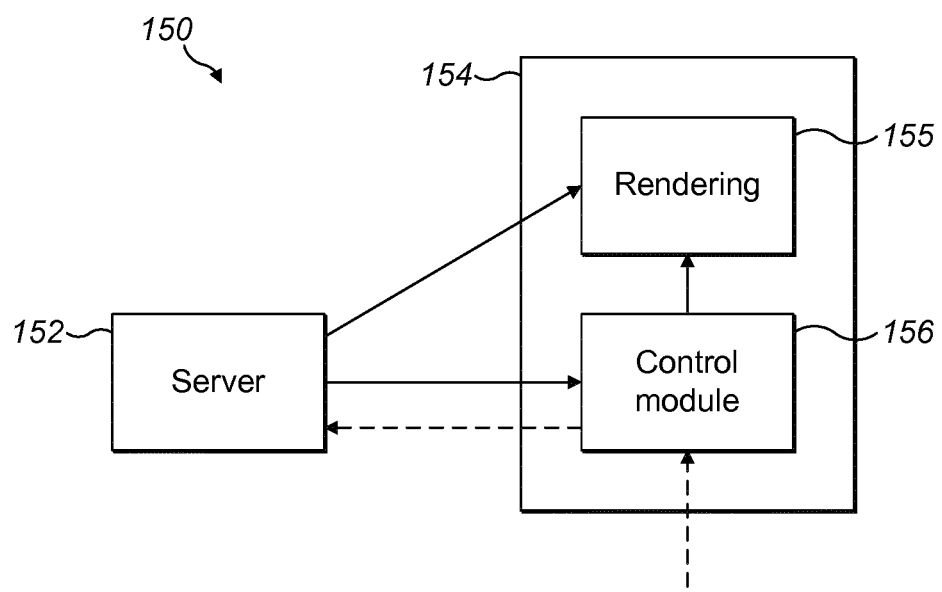
FIG. 15 is a block diagram of a system in accordance with an example embodiment.

FIG. 15 is a block diagram of a system, indicated generally by the reference numeral 150, in accordance with an example embodiment. The system 150 comprises a server 152 and a user device 154. As described above, multiple instances of the user device 154 may be provided (not shown in FIG. 15). The user device 154 includes a rendering module 155 and a control module 156. The server is in communication with the rendering module 155 and the control module 156. The rendering module 155 renders objects for display to a user (such as the interactive objects described further above). (It should be noted that whilst separate control and rendering modules are shown in FIG. 15, the functions of those modules could be provided within a single control and rendering module).

The server 152 may send content (such as visual and/or audio interaction objects) to the rendering module 155 of the user device 154. The server 152 may send metadata to the control module 156 of the user 154. Of course, although separate content and metadata signals are shown in FIG. 15, a single combined signal could be sent from the server 152 to the user device 154.

By way of example, the metadata may include one or more of:
 A target time (e.g. GPS time) to reach an interaction object;
 A distance to a user's current position;

Alternative positions for interaction objects (e.g. content creator driven);

Possible interaction object compensation methods (e.g. whether moving interaction objects or changing user speed is preferred);

Whether to use even delay distribution or allow dynamic delay compensation;

Auxiliary content to play during interaction object validity period;

Conditions and rendering modifications for auxiliary content.

The control module 156 may receive addition information (indicated by a dotted line in FIG. 15). The addition information may include, for example, a current time, details of broadcast delay, or a user position within a defined content.

The control module 154 may control how and where in a scene an interactive object is rendered based on the metadata. The example metadata described above may be handled as set out below.

In a "target time to reach object" mode, the metadata may describe a target time for the user to reach an interaction object. The control module 156 then, based on the user's position, instructs the rendering module 155 to place the interaction object to a position in a scene that is a certain distance away from the user. The distance may be calculated to be the distance that the user covers when moving at a regular pace in the time duration from a current time to the target time to reach the object. If the scene is too small compared to the distance, the control module 156 may wait until the distance gets small enough to be placed in the scene.

In a "distance to the user's position" mode, the metadata may describe an initial distance from the user for the interaction object. The control module 156 may instruct the rendering module 155 to places the object to a position in the scene that is located the preferred distance away from the user's current position.

Figure 16:
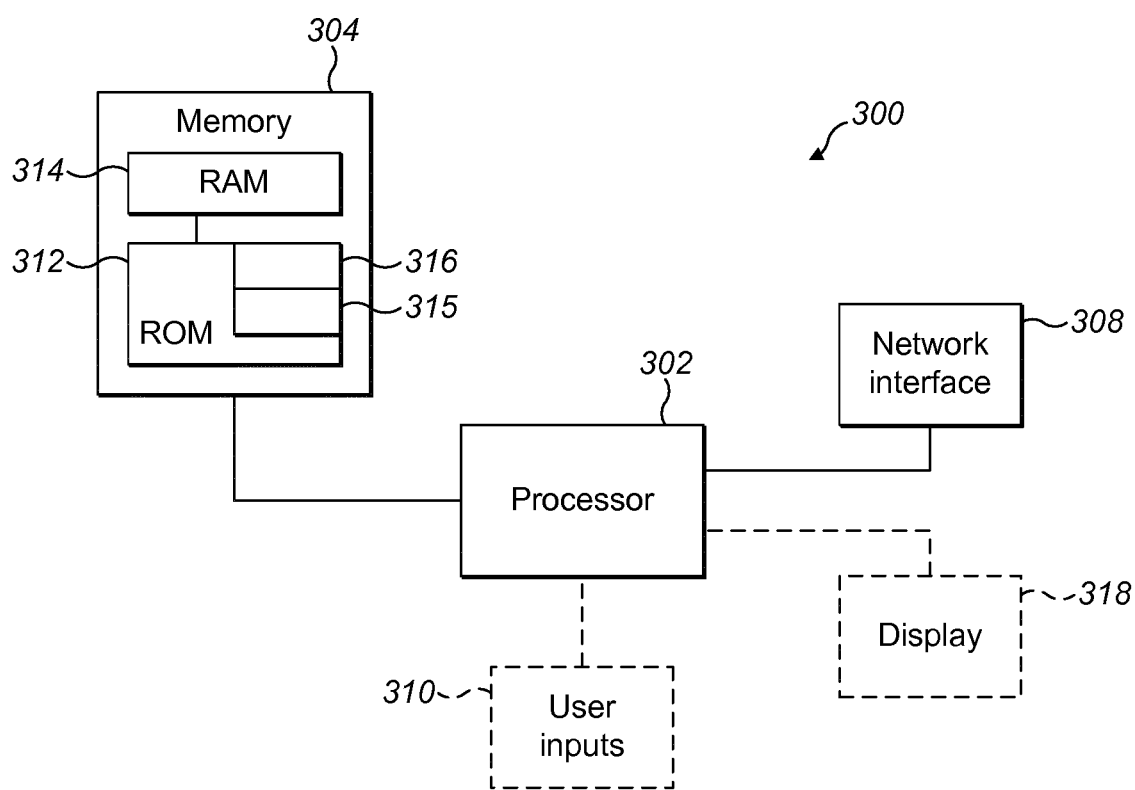
FIG. 16 is a block diagram of components of a system in accordance with an exemplary embodiment.

For completeness, FIG. 16 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible. User input 310 and display 318 may be connected to a remote processor like ground control station. Remote connection may be LTE or 5G type fast connection between remote processor and processor.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 70 and 80 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
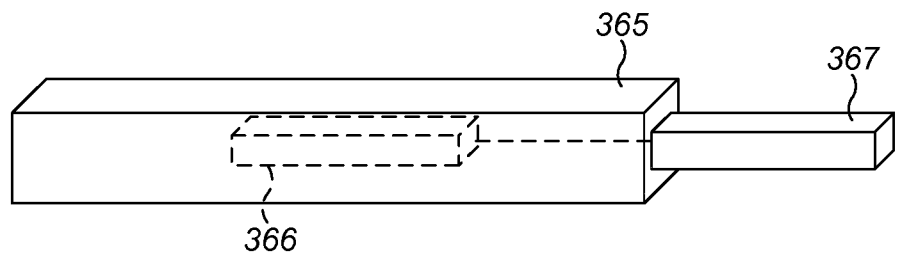
FIGS. 17A and 17B show tangible media, respectively a removable non-volatile memory unit and a compact disc (CD) storing computer-readable code which when run by a computer perform operations according to embodiments.
Figure 17B:
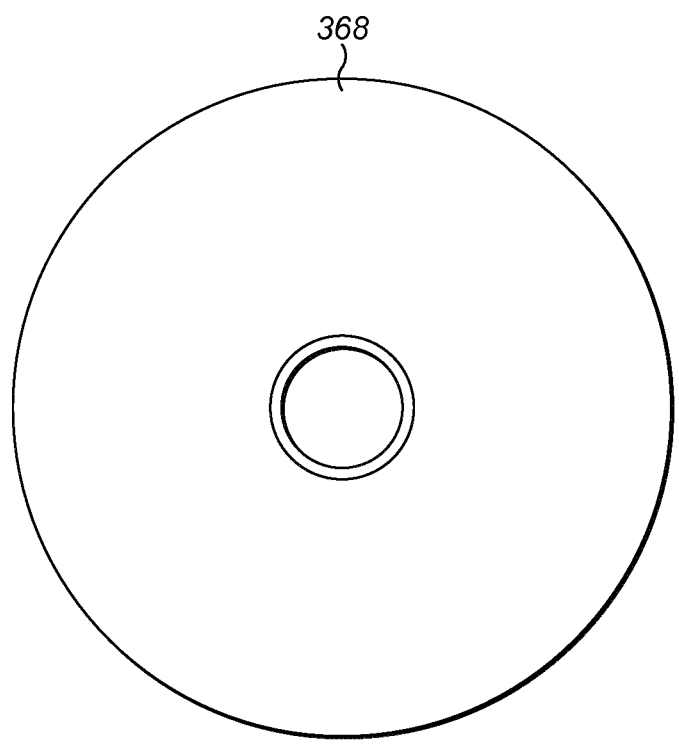

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 1 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification. For example, it would be possible to extend the principles described herein to other applications, such as the control of robots or similar objects.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code,
   the at least one memory and the computer program code configured to, with the at least one processor, cause the apparatus to perform at least the following:
   receive first interaction data at a first user in a multi-user virtual environment, wherein the multi-user virtual environment comprises a plurality of users including the first user;
   receive metadata relating to the first interaction data at the first user; and
   render a first interactive object to the first user within the multi-user virtual environment in accordance with the first interaction data and the metadata,
   wherein the metadata comprises (i) instructions for selectively modifying one or more of the rendering of the first interactive object and an interaction of the first user within the multi-user virtual environment and (ii) one or more of: a target time for the first user to reach the rendered first interactive object, one or more alternative positions for the first interactive object, an indication to move the first interactive object or the first user responsive to a necessary modification, an indication to use even delay distribution or dynamic delay compensation, or auxiliary content to play during a validity period for the first interactive object.

2. The apparatus as claimed in claim 1, wherein the metadata further comprises an initial distance between a current position of the first user and the rendered first interactive object within the multi-user virtual environment.

3. The apparatus as claimed in claim 1, wherein modifying the rendering of the first interactive object comprises one or more of:
   modifying a position of the rendering within the multi-user virtual environment; or
   placing one or more obstacles between a current position of the first user and the rendering of the first interactive object within the multi-user virtual environment.

4. The apparatus as claimed in claim 1, wherein modifying the interaction of the first user with the multi-user virtual environment comprises one or more of:
   modifying a movement speed of the first user within the multi-user virtual environment;
   modifying one or more other interactive objects in the multi-user virtual environment; or
   modifying a start time of an event.

5. The apparatus as claimed in claim 1, further caused to:
   provide at least one of a notification to the first user in the event of a modification of the rendering of the first interactive object or a modification of the interaction of the first user within the multi-user virtual environment in accordance with the metadata.

6. The apparatus as claimed in claim 1, further caused to:
   receive a plurality of interaction data, the plurality of interaction data including the first interaction data;
   receive a plurality of corresponding metadata; and
   render a plurality of interactive objects to the first user within the multi-user virtual environment in accordance with the plurality of interaction data and the metadata, wherein the plurality of interactive objects comprises the first interactive object.

7. The apparatus as claimed in claim 1, wherein the first interactive object is a virtual object.

8. An apparatus comprising:
   at least one processor; and
   at least one memory including computer program code,
   the at least one memory and the computer program code configured to, with the at least one processor, cause the apparatus to perform at least the following:
   provide first interaction data to each of a plurality of users in a multi-user virtual environment, wherein the first interaction data provides initial instructions for rendering an interactive object within the multi-user virtual environment; and
   provide metadata relating to the first interaction data to each of the plurality of users,
   wherein the metadata includes (i) instructions for selectively modifying one or more of a rendering of the respective interactive object to the respective user and an interaction of the respective user within the multi-user virtual environment and (ii) one or more of: a target time for the respective user to reach the respective interactive object, one or more alternative positions for the respective interactive object, an indication to move the respective interactive object or the respective user responsive to a necessary modification, an indication to use even delay distribution or dynamic delay compensation, or auxiliary content to play during a validity period for the respective interactive object.

9. The apparatus as claimed in claim 8, further caused to:
determine broadcast delays for receiving the first interaction data at control modules of each of the plurality of users.

10. The apparatus as claimed in claim 8, wherein at least one of modifying the rendering of the respective interactive object or modifying the interaction of the respective user within the multi-user virtual environment is arranged to compensate for differing interaction delays among the plurality of users.

11. The apparatus as claimed in claim 8, wherein said modifying for the first user starts after a reaction of the any one of the plurality of users to receiving the first interactive object.

12. The apparatus as claimed in claim 8, wherein the interactive object is a virtual object.

13. A method comprising:
receiving first interaction data at a first user in a multi-user virtual environment, wherein the multi-user virtual environment comprises a plurality of users including the first user;
receiving metadata relating to the first interaction data at the first user; and
rendering a first interactive object to the first user within the multi-user virtual environment in accordance with the first interaction data and the metadata,
wherein the metadata includes (i) instructions for selectively modifying one or more of the rendering of the first interactive object and an interaction of the first user within the multi-user virtual environment and (ii) one or more of: a target time for the first user to reach the rendered first interactive object, one or more alternative positions for the first interactive object, an indication to move the first interactive object or the first user responsive to a necessary modification, an indication to use even delay distribution or dynamic delay compensation, or auxiliary content to play during a validity period for the first interactive object.

14. The method as claimed in claim 13, wherein the metadata comprises an initial distance between a current position of the first user and the rendered first interactive object within the multi-user virtual environment.

15. The method as claimed in claim 13, wherein modifying the rendering of the first interactive object comprises one or more of:
modifying a position of the rendering within the multi-user virtual environment; or
placing one or more obstacles between a current position of the first user and the rendering of the first interactive object within the multi-user virtual environment.

16. The method as claimed in claim 13, wherein modifying the interaction of the first user with the multi-user virtual environment comprises one or more of:
modifying a movement speed of the first user within the multi-user virtual environment;
modifying one or more other interactive objects in the multi-user virtual environment; or
modifying a start time of an event.

17. The method as claimed in claim 13, further comprising:
providing a notification to the first user in the event of at least one of a modification of the rendering of the first interactive object or a modification of the interaction of the first user within the multi-user virtual environment in accordance with the metadata.

18. The method as claimed in claim 13, further comprising:
receiving a plurality of interaction data, the plurality of interaction data including the first interaction data;
receiving a plurality of corresponding metadata; and
rendering a plurality of interactive objects to the first user within the multi-user virtual environment in accordance with the plurality of interaction data and the metadata, wherein the plurality of interactive objects comprises the first interactive object.

19. The method as claimed in claim 13, wherein the first interactive object is a virtual object.

20. A non-transitory computer readable medium comprising program instructions stored thereon for performing at least the following:
receive first interaction data at a first user in a multi-user virtual environment, wherein the multi-user virtual environment comprises a plurality of users including the first user;
receive metadata relating to the first interaction data at the first user; and
render a first interactive object to the first user within the multi-user virtual environment in accordance with the first interaction data and the metadata,
wherein the metadata comprises (i) instructions for selectively modifying one or more of the rendering of the first object and an interaction of the first user within the multi-user virtual environment and (ii) one or more of: a target time for the first user to reach the rendered first interactive object, one or more alternative positions for the first interactive object, an indication to move the first interactive object or the first user responsive to a necessary modification, an indication to use even delay distribution or dynamic delay compensation, or auxiliary content to play during a validity period for the first interactive object.

* * * * *